United States Patent
Yu et al.

(10) Patent No.: US 9,047,902 B1
(45) Date of Patent: Jun. 2, 2015

(54) TOUCHDOWN SENSOR HAVING A MORE STABLE CRYSTAL STRUCTURE FOR USE IN HARD DISK DRIVES

(75) Inventors: Chengtao R. Yu, Mountain House, CA (US); Yunfei Li, Fremont, CA (US); Yunfei Ding, Fremont, CA (US); Ying Hong, Morgan Hill, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 231 days.

(21) Appl. No.: 13/160,752

(22) Filed: Jun. 15, 2011

(51) Int. Cl.
*G11B 5/39* (2006.01)
*G11B 5/60* (2006.01)
*G11B 5/31* (2006.01)

(52) U.S. Cl.
CPC .............. *G11B 5/6076* (2013.01); *G11B 5/607* (2013.01); *G11B 5/314* (2013.01); *G11B 5/3906* (2013.01); *G11B 5/3967* (2013.01)

(58) Field of Classification Search
CPC .......................................... G11B 5/39–5/3993
USPC ................................................... 360/313–328
See application file for complete search history.

(56) References Cited

U.S. PATENT DOCUMENTS

| | | | |
|---|---|---|---|
| 5,731,936 A * | 3/1998 | Lee et al. ................ | 360/327.22 |
| 6,097,559 A | 8/2000 | Ottesen et al. | |
| 6,196,062 B1 | 3/2001 | Wright et al. | |
| 6,258,468 B1 * | 7/2001 | Mahvan et al. ............ | 428/679 |
| 6,452,735 B1 | 9/2002 | Egan et al. | |
| 6,801,376 B2 | 10/2004 | Smith | |
| 6,822,814 B2 | 11/2004 | Ng et al. | |
| 6,980,383 B2 | 12/2005 | Brunnett et al. | |
| 7,068,457 B2 | 6/2006 | Riddering et al. | |
| 7,124,625 B1 | 10/2006 | Kurita et al. | |
| 7,423,830 B2 | 9/2008 | Ma et al. | |
| 7,796,356 B1 | 9/2010 | Fowler et al. | |
| 7,800,858 B1 | 9/2010 | Bajikar et al. | |
| 7,830,634 B2 | 11/2010 | Chen et al. | |
| 2002/0097513 A1 | 7/2002 | Ng et al. | |
| 2005/0052793 A1 | 3/2005 | Hong et al. | |
| 2008/0186621 A1 | 8/2008 | Partee | |
| 2008/0225426 A1 | 9/2008 | Roy et al. | |
| 2008/0273260 A1 | 11/2008 | Liu et al. | |
| 2010/0020439 A1 | 1/2010 | Watanabe | |
| 2010/0157477 A1 | 6/2010 | Morinaga et al. | |
| 2010/0177429 A1 | 7/2010 | Lee et al. | |
| 2011/0295128 A1 * | 12/2011 | Yuasa et al. ............... | 600/485 |

OTHER PUBLICATIONS

Liu, Y.F., J.W. Cai and L Sun, "Large Enhancement of Anisotropic Magnetoresistance and Thermal Stability in Ta/NiFe/Ta Trilayers with Interfacial Pt Addition," Applied Physics Letters 96, 092509, American Institute of Physics, 2010.

* cited by examiner

*Primary Examiner* — Craig A. Renner

(57) ABSTRACT

A method and system for providing a touchdown sensor for use in disk drive is described. The touchdown sensor includes a seed layer, a sensor layer on the seed layer, and a capping layer. The sensor layer includes NiFe. In some embodiments, at least one of the seed layer and the capping layer promote stability and performance of the sensor layer.

19 Claims, 3 Drawing Sheets

US 9,047,902 B1

TOUCHDOWN SENSOR HAVING A MORE STABLE CRYSTAL STRUCTURE FOR USE IN HARD DISK DRIVES

BACKGROUND

Disk drives typically use heads residing on sliders to read from and write to the magnetic media. Read and write transducers residing in the head are flown at a small, controlled spacing above the magnetic medium during read and write operations. Although generally desired to operate in close proximity to but not touching the disk, the head may also contact the media. This prolonged contact, for example on the order of tens of microseconds or more, is known as touchdown. For example, heads typically use a thermal actuator that generates heat to control the head-media spacing. Heat generated by the thermal actuator causes local thermal expansion of the head, which locally reduces the spacing between the head and magnetic media. The thermal actuator can be driven to induce sufficient heating for contact between the head and media, or touchdown. This touchdown is intentional and is generally performed on each drive during initial drive calibration. Touchdown may also occur at other times during disk drive operation, for example due to changes in environmental conditions, operation of the disk drive outside of desired parameters, or contamination to the head that causes the prolonged contact described above.

Touchdown is detected in the drive operation as well as in testing. Conventional touchdown detection may be performed using a variety of techniques. For example, touchdown sensors consisting of a single layer of NiFe has been used. NiFe typically has a relatively large temperature coefficient of resistivity (TCR). The change in resistivity of a NiFe film with temperature may thus be relatively high. As the disk drive experiences touchdown, the temperature of the NFe sensor changes. For example, a 3-5 degree Celsius change in temperature may abruptly occur. The change in temperature changes the resistivity of the NiFe sensor. Using this jump in resistivity of the NiFe sensor, touchdown might be detected.

Although such conventional methods for detecting touchdown function, there are drawbacks. For example, performance a touchdown sensor containing NiFe may significantly degrade over time and/or usage. As the NiFe undergoes thermal cycling during use, the TCR degrades. Over time, the ability of a touchdown sensor including such a film thus may become inhibited. Thus, touchdown may not be detected.

Accordingly, what is needed is a system and method for providing improved touchdown detection.

BRIEF SUMMARY OF THE INVENTION

A method and system for providing a touchdown sensor for use in disk drive is described. The touchdown sensor includes a seed layer, a sensor layer on the seed layer, and a capping layer. The sensor layer includes NiFe. In some embodiments, at least one of the seed layer and the capping layer promote stability and/or performance of the sensor layer.

DETAILED DESCRIPTION OF THE PREFERRED EMBODIMENTS

Figure 1:
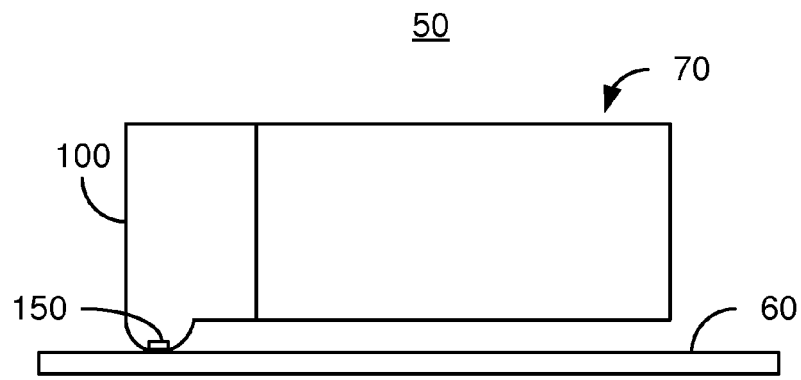
FIG. 1 is a diagram of a portion of an exemplary embodiment of a disk drive including a touchdown sensor.

FIG. 1 is a diagram of a portion of an exemplary embodiment of a disk drive 50, which may employ a touchdown sensor. For simplicity, components are omitted. In addition, for clarity, FIG. 1 is not drawn to scale. The disk drive 50 includes a media 60 and a slider 70. On the slider 70 resides head 100, which includes a touchdown sensor 150. The touchdown sensor 150 is a thermal sensor and, in one embodiment, is a thermistor.

The disk drive 50 is shown at touchdown. Consequently, the head 100 contacts the media 60 in the region of the touchdown sensor 150. The touchdown sensor 150 detects touchdown based upon the local temperature of the head 100. In particular, frictional heating due to contact between the media 60 and head 100 raises the temperature of the head 100 in the region proximate to where touchdown occurs. Furthermore, the head 100 typically vibrates during touchdown, which may cause an oscillation in temperature. The touchdown sensor 150 is located in this touchdown region. Thus, the touchdown sensor 150 is able to detect temperature changes due to contact between the head 100 and disk 60.

Figure 2:
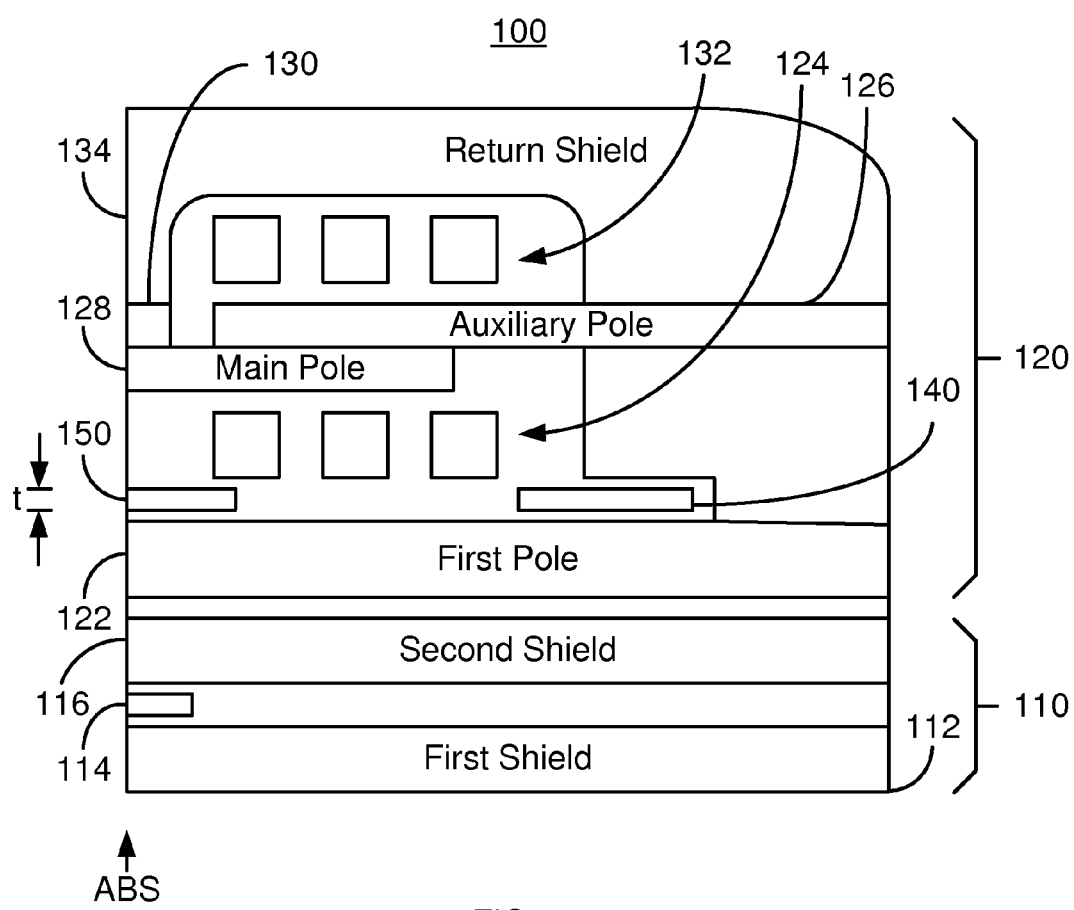
FIG. 2 depicts an exemplary embodiment of a head having a transducer including an integrated touchdown sensor.

FIG. 2 depicts an exemplary embodiment of a portion of the magnetic head 100. For simplicity, components of the head 100 are omitted and the media 60 is not shown in FIG. 2. In addition, for clarity, FIG. 2 is not drawn to scale. The magnetic head 100 includes a magnetic read transducer 110 and write transducer 120. Referring to FIGS. 1-2, the head 100 may reside on the slider 70 of a disk drive 50. The head 100 is also described in the context of particular components and layers. However, in some embodiments, such layers may include sub-layer(s). In addition, some components may be moved, omitted, or combined with other components.

The read transducer 100 is used in reading from the media 60. The read transducer 110 includes shields 112 and 116 and sensor 114. The read sensor 114 may include a giant magnetoresistive sensor, such as a tunneling magnetoresistive junction. However, in other embodiments, the read sensor 114 may include other and/or additional components.

The write transducer 120 is used in writing to the media 60. The write transducer 140 is shown as including a first pole 122, auxiliary pole 126, main pole 128, write gap 130, coils 124 and 132, and return shield 134. However, in another embodiment, the write transducer 120 other and/or different components. For example, in other embodiments, the write transducer 120 may be an energy assisted magnetic recording (EAMR) transducer including optics for directing light energy toward a media for heating. In addition, one or more portions of the write transducer 120 might be omitted in various embodiments. The first pole 122 is shown as separate from shield 116. However, in another embodiment, the second shield 116 and first pole 122 may be combined.

The head 100 may also include thermal actuator 140 and touchdown sensor 150 having a thickness, t. Although the thermal actuator 140 and touchdown sensor 150 are shown at particular locations in FIGS. 1 and 2, in other embodiments, these components 140 and 150 may be located elsewhere. The thermal actuator 140 may be used to induce touchdown, as shown in FIG. 1, and otherwise control the spacing of the head 100 to the media 60. For example, a current may be driven through the thermal actuator 140, which generates heat in the region of the transducers 110 and 120. As a result, the transducers 120 and/or 110 may bulge outward toward the media 60, as shown in FIG. 1. When enough heat is generated by the thermal actuator 140, sufficient thermal protrusion occurs for intentional touchdown. However, in other embodiments, the thermal actuator 140 might be omitted.

The head 100 also includes a touchdown sensor 150, which is used to detect touchdown of the head 100 on the media 60. In the embodiment shown, the touchdown sensor 150 is located near the first pole 122. However, in other embodiments, the touchdown sensor 150 may be located elsewhere or may be used in another manner. The touchdown sensor 150 is used to sense touchdown due to thermal changes in the head 100. This touchdown may be intentional, as caused by the thermal actuator 140 or other analogous mechanism. In some embodiments, inadvertent touchdown may also be detected. Once touchdown is detected using the touchdown sensor 150, the thermal actuator 140 may be driven at a lower power in order to ensure that there is a desired space between the head 100 and media 60. Thus, the fly height of the head 100 may be selected and controlled.

In the embodiment shown, the touchdown sensor 150 is a temperature sensor. In operation, the touchdown sensor 150 senses the changes in temperature of the transducer 120 due to heat generated by the thermal actuator 140 and other components of the head 100. Upon touchdown, contact between the head 100 and media 60 can cause sharp changes, or jumps, in the temperature of the head 150. The temperature changes persist during touchdown. The temperature sensor 150 is capable of detecting theses relatively abrupt changes in temperature.

In the embodiment shown in FIGS. 1-2, the touchdown sensor 150 is exposed to the air-bearing surface (ABS). However, in another embodiment, the touchdown sensor 150 may be recessed from the ABS. The touchdown sensor 150 is, however, desired to be sufficiently close to the ABS to detect temperature changes due to touchdown. For example, in one embodiment, the touchdown sensor 150 may be not more than ten to one hundred nanometers from the ABS. in another embodiment, the touchdown sensor 150 may be further from the ABS, for example up to one micron from the ABS. In addition, the touchdown sensor is also desired to be exposed to the same environment as the transducers 110 and 120, including heat from the thermal actuator 140.

Figure 3:
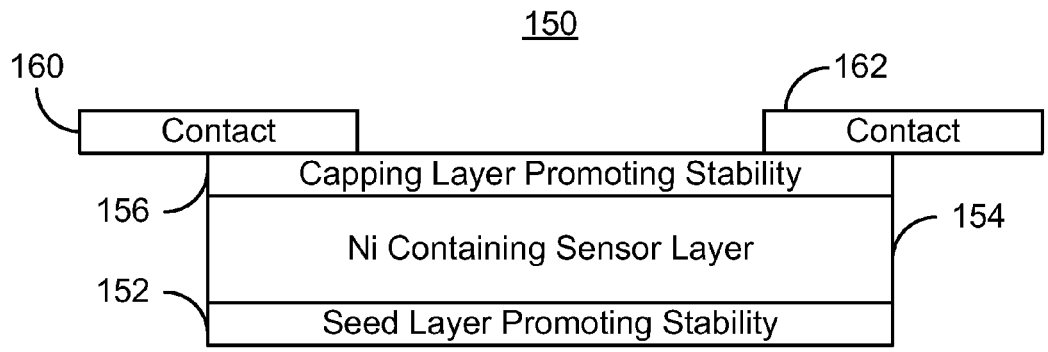
FIG. 3 depicts an exemplary embodiment of a touchdown sensor that may be used in a head/disk drive.

FIG. 3 depicts an exemplary embodiment of a touchdown sensor 150 used in the head 100 depicted in FIGS. 1-2. For simplicity, FIG. 3 is not to scale. In addition to the actual sensor 150, contacts 160 and 162 are also shown. The contacts 160 and 162 may be metallic, for example composed of Ru. The contacts 160 and 162 may be used to drive current through the sensor 150, as well as read the resistance and thus temperature from the sensor 150. The contacts 160 and 162 are shown as both above the temperature sensor 150. However, in other embodiments, the contacts 160 and 162 may be located elsewhere. Although shown as a simple, rectangular layer, the sensor 150 may have another shape that may depend upon the underlying topology.

Figure 7:
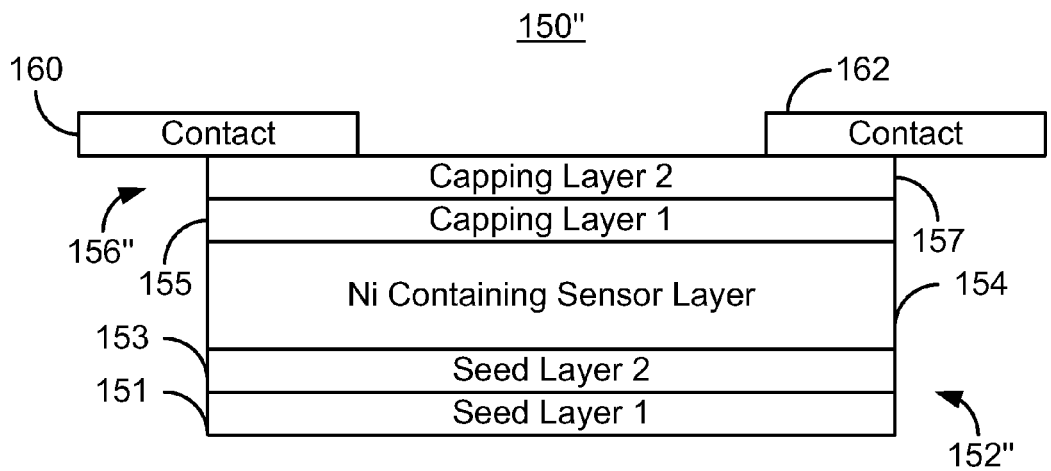
FIG. 7 depicts another exemplary embodiment of a touchdown sensor that may be used in a head/disk drive.

The sensor 150 includes at least three layers—a seed layer 152, a sensor layer 154, and a capping layer 156. Although depicted as simple layers, the seed layer 152, the sensor layer 154, and/or the capping layer 156 may be a multilayer. Such an embodiment in shown in FIG. 7, which depicts a magnetic transducer 150" including multilayer seed layer 152" having layers 151 and 153 and multilayer capping layer 156" having layers 155 and 157. Referring back to FIG. 3, the sensor layer 154 includes Ni. For example, the sensor layer 154 may be a NiFe sensor layer. In some embodiments, the sensor layer 154 is $Ni_{1-x}Fe_x$, where x is at least 0.1 and not more than 0.9. In some such embodiments, x is at least 0.18 and not more than 0.2. In some such embodiments, x is nominally 0.186. The thickness of the sensor layer 154 may depend upon electronics (not shown). In some embodiments, the thickness of the sensor layer 154 may be at least twenty nanometers and not more than one hundred nanometers thick.

The seed layer 152 and/or the capping layer 156 may be configured to promote crystalline stability of the sensor layer 154. The seed layer 152 and/or capping layer 156 are desired to be stable to temperatures above the operating range of the region of the touchdown sensor 150 in the head 100. For example the seed layer 152 and/or the capping layer 156 may have a crystal structure stable up to at least two hundred degrees Celsius when the operating range is up to approximately one hundred fifty degrees Celsius. The stability of the crystal structure(s) of the seed layer 152 and/or capping layer 156 at higher temperatures, such as those at which the head 100 may operate, may improve the stability of the crystal structure of sensor layer 154. Such an improvement may be understood as follows. The sensor layer 154 is surrounded by layers 152 and 156 for which there is not a significant change in crystal structure up to two hundred degrees Celsius or more. Stated differently, there may not be a significant change in grain size, grain boundaries, or a transition to a different crystal structure for the layers 152 and/or 154 up to two hundred degrees Celsius or more. As a result, the crystal structure of the sensor layer 154 would tend to remain substantially locked in place. Crystalline stability of the sensor layer 154 may thereby enhanced.

In some embodiments, at least a portion of the seed layer 152 is amorphous. In other embodiments, at least a portion of the capping layer 156 is amorphous. In some such embodiments, portion(s) of both the seed layer 152 and the capping layer 156 are amorphous. As used herein, an amorphous layer may be completely amorphous, having no defined crystal structure. However, some or all of the "amorphous" layer may have crystalline regions that are small in grain size and do not have a single crystalline orientation. The term amorphous is also intended to apply to such layers. For example, the seed layer 152 and/or capping layer 156 may have a characteristic grain size. A characteristic grain size may be a mean (average) grain size, a median grain size, or other measure of the grain size. In some such embodiments, the characteristic grain size does not exceed ten nanometers. In some embodiments, this characteristic grain size is less than or equal to the thickness of the layer. For a layer 152 and/or 156 having a thickness of one hundred Angstroms, the characteristic grain size for the layer 152 and/or 156 is not more than one hundred Angstroms. In some embodiments, the thickness of the layer 152 and/or 156 is at least thirty and not more than forty Angstroms. Note, however, that there is no requirement that the layers 152 and 156 have the same thickness. In such embodiments, the characteristic grain size for the layer 152 and/or 156 is at least thirty and not more than forty Angstroms. Use of a capping layer 156 and/or seed layer 152 having a small grain size (e.g. a portion of which is amorphous) may improve the performance of the sensor layer 154. For example, it has been determined that seed and/or capping layers that are at least partially amorphous may result in a sensor layer 154 having a smaller grain size. Further, this characteristic grain size for the layers 152 and/or 156 may remain stable up to at least two hundred degrees Celsius. As a result, the crystal structure, including grain size, of the sensor layer 154 may be more stable throughout thermal cycling. Consequently, performance and stability of the layer 130 may be improved.

In some embodiments, the seed layer 152 and/or the capping layer 156 are also diffusion blocking layers. Thus, electromigration of outside material(s) to the sensor layer 154 may be inhibited or prevented. For example, the seed layer 152 and/or capping layer 156 may be oxide barrier layers. The use of oxide barrier layers may prevent oxidation of the NiFe or other oxide-prone material(s) in the sensor layer 154. Thus, the properties of the sensor layer 154, such as the TCR, may be preserved.

In some embodiments, the seed layer 152 and/or the capping layer 156 includes Ta. In some such embodiments, the seed layer 152 and/or capping layer 156 consist of Ta. It is believed that Ta fulfills one or more of the properties described above: a stable crystal structure up to at least two hundred degrees Celsius, is at least partially amorphous as deposited, has a small characteristic grain size that is not larger than the thickness, is a diffusion blocking layer, and an oxide barrier.

In some embodiments, the seed layer 152 and/or capping layer 156 may have a significant lattice mismatch for the material(s) in the sensor layer 154. For example, Ta used in the layers 152 and 156 is a poor lattice match for $Ni_{1-x}Fe_x$, where x is 0.1-0.2. As a poor lattice match, the layers 152 and 156 do not promote the growth of grains in the sensor layer 154. Thus, smaller grains in the sensor layer 154, which are associated with a higher TCR, may be achieved.

Figure 4:
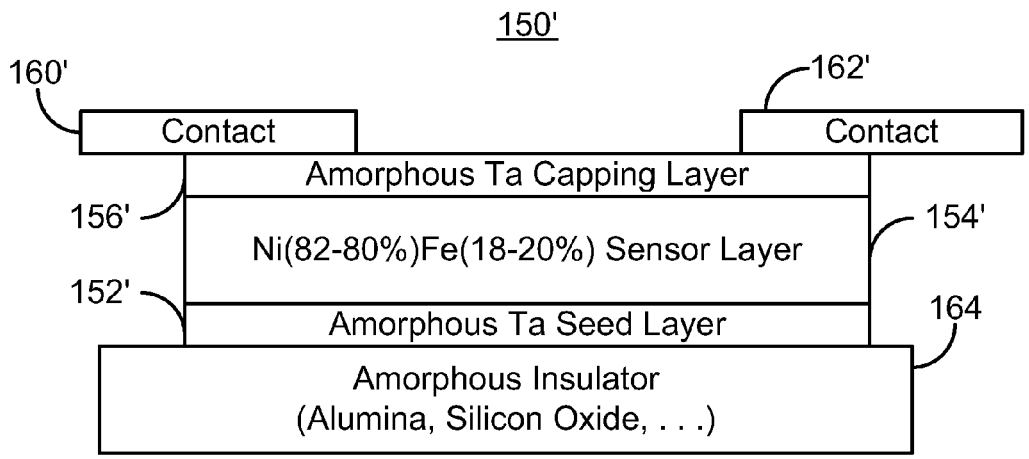
FIG. 4 depicts an exemplary embodiment of a touchdown sensor that may be used in a head/disk drive.

As discussed above, the presence of the seed layer 152 and capping layer 156 may enhance the stability and reliability of the touchdown sensor 150. It is also believed that use of the seed layer 152 alone or the capping layer 156 alone improves performance. It is also believed that the combination of the seed layer 152 and the capping layer 152 results in further improvements over the use of one of the layers 152 or 156 alone. The sensor layer 154 has a particular crystal structure and TCR as fabricated. For a seed layer 152 and/or capping layer 156 that are at least partially amorphous, the sensor layer 154 may have a smaller grain size. The smaller grain size translates to a higher initial TCR. Further, the seed layer 152 and capping layer 156 aid in stabilizing the TCR of the sensor layer 154. It is believed that the TCR of the sensor layer is stabilized because the seed layer 152 and capping layer 156 stabilize the crystal structure of the sensor layer 154. Because of this stability, the TCR may not significantly decrease due to thermal cycling experienced during use of the sensor 150. A change in temperature of, for example, 3-5 degrees Celsius, due to touchdown may still be detected by the sensor 150 even after multiple uses. Performance and, therefore, reliability of the touchdown sensor 150 may thus be improved. FIG. 4 depicts an exemplary embodiment of a touchdown sensor 150' used in the head 100 depicted in FIGS. 1-2 and as the touchdown sensor 150 depicted in FIG. 3. For simplicity, FIG. 4 is not to scale. The touchdown sensor 150' is analogous to the touchdown sensor 150. Consequently, analogous components are labeled similarly. The touchdown sensor 150' thus includes seed layer 152', sensor layer 154', and capping layer 156' that are analogous to layers 152, 154, and 156, respectively. In addition, contacts 160' and 162' analogous to contacts 160 and 162, respectively, are also shown. Although shown as a simple, rectangular layer, the sensor 150' may have another shape that may depend upon the underlying topology. Also shown is insulating layer 164 on which the touchdown sensor 150' is fabricated. The insulating layer 164 is desired to be stable and amorphous to promote the desired characteristics of the touchdown sensor 150'. For example, materials used for the insulating layer 164 include but are not limited to alumina and $SiO_2$.

In the embodiment shown in FIG. 4, the seed layer 152' and capping layer 156' are Ta. The Ta layers 152' and 156' are thin. In some embodiments, the layers 152' and 156' are not more than forty Angstroms thick. Further, the Ta layers 152' and 156' may be considered amorphous as their characteristic grain size may not exceed their thickness. As discussed above, Ta is a diffusion blocker/oxide barrier and may be stable up to temperatures exceeding the operating range of the region in which the touchdown sensor 150' resides. For example, the layers 152' and 156' may be stable up to at least two hundred degrees Celsius. Thus, the seed layer 152' and capping layer 156' may aid in stabilizing the properties of the sensor layer 154'.

In the embodiment shown, the sensor layer 154' is a $Ni_{1-y}Fe_y$ sensor layer, where y is 0.18-0.20. Such a stoichiometry is believed to have a TCR in a desired range. Further, Ta layers 152' and 156' may have a significant lattice mismatch for such a NiFe sensor layer 154'. Further, the Ta layers 152' and 156' are at least partially amorphous. The grain size of the NiFe sensor layer 154' is thus believed to be small. The thickness of the sensor layer 154' may depend upon electronics (not shown). In some embodiments, the thickness of the sensor layer 154' may be at least twenty nanometers and not more than one hundred nanometers thick.

The sensor 150' shares the benefits of the sensor 150. Because of the lattice mismatch and small characteristic grain size/amorphous structure, the seed layer 152' and capping layer 156' promote small grains in the NiFe sensor layer 154'. Thus, the TCR of the sensor layer 154' may be higher. The seed layer 152' and capping layer 156' aid in stabilizing the crystal structure of the sensor layer 154'. The TCR may likewise be more stable. Consequently, performance, stability, and reliability of the touchdown sensor 150' may be improved.

Figure 5:
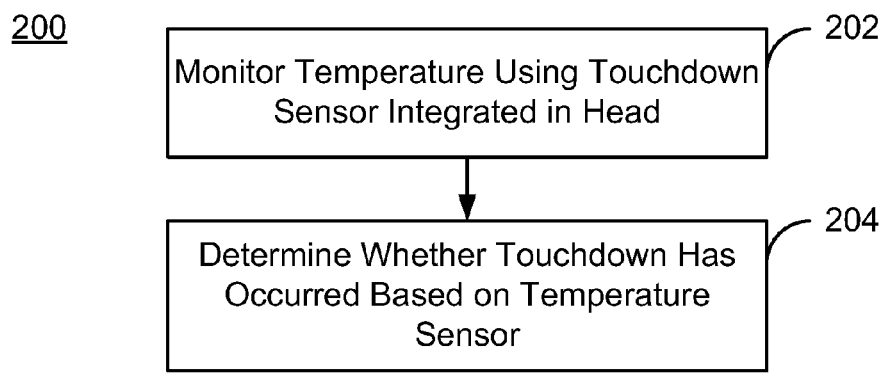
FIG. 5 depicts an exemplary embodiment of a method for detecting touchdown using a touchdown sensor integrated into a head.

FIG. 5 depicts an exemplary embodiment of a method 200 for detecting touchdown using a touchdown sensor integrated into a head. The method 200 is used in connection with the head 100 and touchdown sensor 150/150'. Further, although depicted as a flow of single steps, the steps of the method 200 may be performed in parallel and/or continuously. In addition, the steps of the method 200 may include substeps and/or may be interleaved.

The temperature of the head 100 in the region of the ABS, near a region of the head 100 that touchdown occurs is monitored, via step 202. Step 202 may be performed continuously during calibration or operation of the head 100. It is determined whether touchdown has occurred based on the temperature(s) monitored by the temperature sensor 150/150', via step 204. Step 204 may be accomplished by determining whether the change in temperature of the touchdown sensor 150/150' has exceeded a particular amount. This may translate to determining whether the resistance of the touchdown sensor 150/150' has changed beyond a particular threshold. Thus, the touchdown sensor 150/150' may be used to detect touchdown. The ability to do so over thermal cycling and throughout use of the disk drive 50 may be enhanced by use of the touchdown sensor 150/150'.

Figure 6:
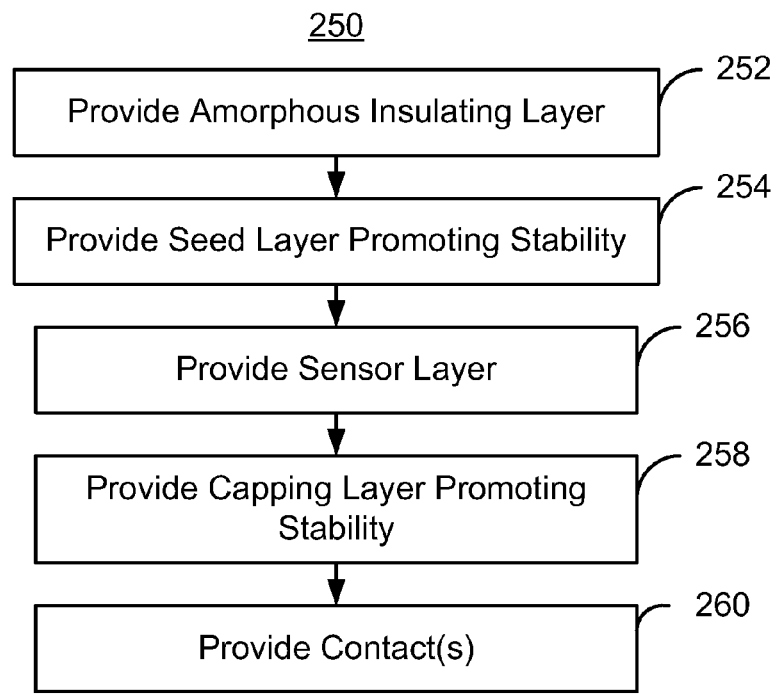
FIG. 6 depicts an exemplary embodiment of a method for providing a touchdown sensor.

FIG. 6 depicts an exemplary embodiment of a method 250 for providing a touchdown sensor. The method 250 is described in connection with the head 100 and touchdown sensors 150/150'. Further, although depicted as a flow of single steps, the steps of the method 250 may be performed in parallel. The steps of the method 250 may include substeps and/or may be interleaved.

An amorphous insulating layer, such as the layer 164, may optionally be provided, via step 252. Thus, the underlayer(s) on which the touchdown sensor 150/150' is to be fabricated are provided.

The seed layer 152/152' is provided, via step 254. Step 254 may include depositing a Ta layer and/or a multilayer. The sensor layer 154/154' is deposited, via step 256. Step 256 may include physical vapor deposition (PVD) or other mechanism for depositing the sensor layer 154/154'. The capping layer 156/156' is also provided, via step 258. The contacts 160/160' and 162/162' are provided, via step 160. Note that if contacts 160/160' and 162/162' are not located as shown in FIGS. 3 and 4, part of step 260 may be performed before step 254 so that the contact 160/160' and/or 162/162' are below the touchdown sensor 150/150'. Step 260 may include deposition and patterning of conductive layers to form contacts.

Using the method 250 the temperature sensor 150/150' may be fabricated in a head. As a result, the benefits of the touchdown sensor 150/150' may be achieved.

We claim:

1. A touchdown sensor comprising:
   a seed layer consisting of Ta;
   a sensor layer including Ni on the seed layer, the sensor layer being temperature sensitive and adjoining the seed layer, the sensor layer being configured to determine touchdown based on a change in a temperature of the sensor layer; and
   a capping layer on the sensor layer, the capping layer adjoining the sensor layer, consisting of Ta;
   wherein at least a portion of at least one of the seed layer and the capping layer is amorphous.

2. The touchdown sensor of claim 1 wherein at least one of the seed layer and the capping layer is a multilayer.

3. The touchdown sensor of claim 1 wherein the sensor layer is $Ni_{1-x}Fe_x$, where x is at least 0.1 and not more than 0.9.

4. The touchdown sensor of claim 1 wherein x is at least 0.18 and not more than 0.2.

5. The touchdown sensor of claim 1 wherein at least one of the seed layer and the capping layer has a crystal structure including a characteristic grain size, a grain boundary and a crystal structure type that remain substantially unchanged up to at least two hundred degrees Celsius.

6. The touchdown sensor of claim 1 wherein at least one of the seed layer and the capping layer has a characteristic grain size of not more than ten nanometers.

7. The touchdown sensor of claim 1 wherein at least one of the seed layer and the capping layer has a thickness and a characteristic grain size of not more than ten nanometers, and wherein the characteristic grain size is not more than the thickness.

8. The touchdown sensor of claim 1 wherein at least one of the seed layer and the capping layer has a thickness of at least ten and not more than one hundred Angstroms.

9. The touchdown sensor of claim 1 wherein the at least one of the seed layer and the capping layer has a thickness of at least thirty and not more than forty Angstroms.

10. The touchdown sensor of claim 1 wherein at least one of the seed layer and the capping layer is an oxide barrier.

11. The touchdown sensor of claim 1 wherein the touchdown sensor consists of the seed layer, the sensor layer and the capping layer.

12. A touchdown sensor comprising:
    a Ta seed layer having a thickness of not more than forty Angstroms;
    a sensor layer on the seed layer, the sensor layer including Ni and Fe, the sensor layer including at least eighteen and not more than twenty atomic percent Fe, the sensor layer being temperature sensitive and adjoining the Ta seed layer, the sensor layer being configured to determine touchdown based on a change in a temperature of the sensor layer; and
    a Ta capping layer on the sensor layer, the Ta capping layer being not more than forty Angstroms thick, the Ta capping layer adjoining the sensor layer, wherein at least one of the Ta seed layer and the Ta capping layer are amorphous.

13. The touchdown sensor of claim 12 wherein the touchdown sensor consists of the Ta seed layer, the sensor layer and the Ta capping layer.

14. A disk drive comprising:
    a slider;
    media;
    a head residing on the slider and having an air-bearing surface (ABS), the head further including a touchdown sensor proximate to the ABS and residing on an amorphous insulating underlayer, the touchdown sensor including a seed layer consisting of Ta, a sensor layer including Ni on the seed layer, the sensor layer being temperature sensitive and adjoining the seed layer, the sensor layer being configured to determine touchdown based on a change in a temperature of the sensor layer, and a capping layer on the sensor layer, the capping layer adjoining the sensor layer and consisting of Ta;
    wherein at least a portion of at least one of the seed layer and the capping layer is amorphous; and
    touchdown sensor control circuitry coupled with the touchdown sensor, the touchdown sensor control circuitry for driving a current through the touchdown sensor and converting a signal from the touchdown sensor into an indication of whether touchdown has occurred.

15. The disk drive of claim 14 wherein at least one of the seed layer and the capping layer is a multilayer.

16. The disk drive of claim 14 wherein the sensor layer is $Ni_{1-x}Fe_x$, where x is at least 0.18 and not more than 0.2.

17. The disk drive of claim 14 wherein at least one of the seed layer and the capping layer has a crystal structure stable up to at least two hundred degrees Celsius.

18. The disk drive of claim 14 wherein at least one of the seed layer and the capping layer has a thickness and a characteristic grain size that is not larger than the thickness.

19. The disk drive of claim 14 wherein at least one of the seed layer and the capping layer has a thickness of at least thirty and not more than forty Angstroms.

* * * * *